United States Patent [19]

Squiller et al.

[11] Patent Number: 5,124,447
[45] Date of Patent: Jun. 23, 1992

[54] AMBIENT TEMPERATURE CURABLE ONE-COMPONENT POLYURETHANE OR POLYUREA COMPOSITIONS

[75] Inventors: Edward P. Squiller, Wheeling, W. Va.; Peter H. Markusch, McMurray, Pa.

[73] Assignee: Miles Inc., Pittsburgh, Pa.

[21] Appl. No.: 558,735

[22] Filed: Jul. 27, 1990

[51] Int. Cl.⁵ ............................................. C08L 63/00
[52] U.S. Cl. ..................................... 528/45; 528/60; 528/68; 528/73; 523/415; 523/414; 523/417
[58] Field of Search .................. 528/45, 73, 60, 68; 524/590; 260/9; 523/415

[56] References Cited

U.S. PATENT DOCUMENTS

| | | | |
|---|---|---|---|
| 3,488,302 | 1/1970 | Pyron | 260/9 |
| 4,278,580 | 7/1981 | Schmölzer et al. | 528/45 |
| 4,390,678 | 6/1983 | LaBelle et al. | 528/60 |
| 4,412,033 | 10/1983 | LaBelle et al. | 524/590 |
| 4,483,974 | 11/1984 | Grögler et al. | 528/68 |
| 5,034,435 | 7/1991 | Squiller et al. | 523/415 |

Primary Examiner—John Kight, III
Assistant Examiner—Duc Truong
Attorney, Agent, or Firm—Joseph C. Gil; Thomas W. Roy

[57] ABSTRACT

The present invention is directed to a one-component polyurethane or polyurea composition which may be cured at either ambient or elevated temperature and is based on a) a liquid blocked polyisocyanate wherein the isocyanate groups have been blocked with a phenolic blocking agent.
b) a solid polyamine salt which is insoluble in and dispersed throughout the liquid blocked polyisocyanate, the solid polyamine salt being based on the reaction product of a polyamine with an organic or inorganic acid.

The present invention is also directed to a process for the preparation of a high molecular weight polymer by heating the one-component composition at elevated temperature or by adding a polar solvent to the above coating composition and allowing the composition to cure.

9 Claims, No Drawings

AMBIENT TEMPERATURE CURABLE ONE-COMPONENT POLYURETHANE OR POLYUREA COMPOSITIONS

BACKGROUND OF THE INVENTION

1. Field of the Invention

The present invention is directed to improved one-component polyurethane or polyurea compositions based on solid polyamine salts dispersed in liquid blocked polyisocyanates which may be cured under ambient conditions or at elevated temperature.

DESCRIPTION OF THE PRIOR ART

One-component polyurethane compositions are known. For example, U.S. Pat. No. 3,488,302 is directed to solid isocyanate-reactive compounds, preferably polyols such as pentaerythritol, dispersed in a liquid isocyanate-terminated prepolymer at an equivalent ratio of isocyanate-reactive groups to isocyanate groups of about 2:1 to 100:1, preferably about 5:1 to 30:1. U.S. Pat. Nos. 4,390,678 and 4,412,033 are directed to solid polyols such as pentaerythritol dispersed in liquid isocyanate-terminated prepolymers based on aromatic and aliphatic polyisocyanates, respectively. In all of these patents it is disclosed that the one-component polyurethane compositions are cured by heating the compositions above the melting point of the dispersed polyol.

U.S. Pat. No. 4,483,974 is also directed to a one-component polyurethane composition; however, in this case solid polyisocyanates are dispersed in a liquid isocyanate-reactive compound. The solid polyisocyanates have a polyurea surface skin, prepared by reacting the polyisocyanates with compounds such as polyamines, in order to retard their reaction with the liquid isocyanate-reactive compound. This patent discloses curing the one-component compositions by heating the compositions above the melting point of the solid polyisocyanate. It is also disclosed (column 3, lines 35–44; column 4, lines 56–61; column 24, line 61 through column 25, line 19; and Example 23) that the compositions may be cured by adding a polar solvent to dissolve the solid polyisocyanate. Suitable polar solvents are those which are inert to isocyanate groups.

In all of the previously described one-component polyurethane compositions, free isocyanate groups remain in the compositions. Accordingly, special handling precautions must be followed when working with these compositions. Also, care must be taken to avoid the presence of moisture since it can react with the free isocyanate groups and limit the effectiveness of these compositions for their intended use. This means that all additives such as pigments and solvents be dewatered.

One-component compositions based on blocked polyisocyanates and an isocyanate-reactive compound are also known. Because these compositions do not contain free isocyanate groups, they generally require elevated temperatures for curing which precludes their use in certain applications requiring low temperature curing conditions, e.g., to protect the substrate.

In copending application, one-component compositions based on phenolic blocked polyisocyanates and solid polyamines have been disclosed. These compositions may be cured either at ambient temperature by the addition of a polar solvent or at elevated temperatures. Even though the compositions are storage stable for at least one week at ambient temperature, it would be desirable to further improve the storage stability.

Accordingly, it is an object of the present invention to provide one-component polyurethane or polyurea compositions which can be cured at either ambient or elevated temperatures. It is also an object of the present invention to provide compositions which do not contain free isocyanate groups and, thus, do not require special handling procedures or the extra expense of removing water from additives. Finally, it is an object of the present invention to provide compositions which possess improved storage stability.

These objects may be achieved in accordance with the present invention as described hereinafter.

SUMMARY OF THE INVENTION

The present invention is directed to a one-component polyurethane or polyurea composition which may be cured at either ambient or elevated temperature and is based on a) a liquid polyisocyanate wherein the isocyanate groups have been blocked with a phenolic blocking agent.

b) a solid polyamine salt which is insoluble in and dispersed throughout the liquid polyisocyanate, the solid polyamine salt being based on the reaction product of a polyamine with an organic or inorganic acid.

The present invention is also directed to a process for the preparation of a high molecular weight polymer by heating the one-component composition at elevated temperature or by adding a polar solvent to the above coating composition and allowing the composition to cure.

DETAILED DESCRIPTION OF THE INVENTION

In accordance with the present invention "polyurethane" is defined as a polyisocyanate polyaddition product which contains both urethane and urea groups and "polyurea" is defined as a polyisocyanate polyaddition product which contains urea groups.

Polyisocyanates which are suitable for use in accordance with the present invention are those wherein the isocyanate groups have been blocked with a phenolic blocking agent. The isocyanate groups may have aromatically-, aliphatically-, cycloaliphatically- or aralphatically-bound isocyanate groups. The polyisocyanates prior to the blocking reaction have an isocyanate content of about 1 to 30, preferably about 2 to 25 weight percent, based on the polyisocyanate, and contain an average of about 2 to 6, preferably about 2 to 4 isocyanate groups per molecule.

The polyisocyanates which are suitable for use in preparing the polyisocyanate component may be monomeric polyisocyanates, polyisocyanate adducts or isocyanate-terminated prepolymers. The polyisocyanate adducts are generally prepared from monomeric polyisocyanates, preferably monomeric diisocyanates and contain biuret, allophanate, urea, urethane, carbodiimide or uretdione groups or isocyanurate rings. Suitable polyisocyanates which may be used as the monomeric polyisocyanates or for preparing the polyisocyanate adducts include organic diisocyanates represented by the general formula

in which R represents an organic group obtainable by removal of the isocyanate groups from an organic diisocyanate having a molecular weight of from about 112 to 1,000, and preferably from about 140 to 400. Preferred diisocyanates are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6–15 carbon atoms. Examples of the organic/diisocyanates which are particularly suitable for the process include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)methane, 1,3- and 1,4-bis-(isocyanatomethyl)-cyclohexane, bis-(4-isocyanato-3-methylcyclohexyl)-methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene. Also suitable are polyisocyanates such as 4,4',4"-triphenylmethane triisocyanate and polyphenyl polymethylene polyisocyanates obtained by phosgenating aniline/formaldehyde condensates. Mixtures of diisocyanates and/or polyisocyanates may, of course, also be used. Preferred o diisocyanates are 1,6-hexamethylene diisocyanate, isophorone diisocyanate, bis-(4-isocyanatocyclohexyl)-methane, 2,4- and/or 2,6- toluylene diisocyanate and 2,4'- and/or 4,4'-diphenylmethane diisocyanate.

Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using co-reactants such as water, tertiary alcohols, primary and secondary monoamines, and primary and-/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Patent 994,890 and German Offenlegungsschrift 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift 1,150,080; German Offenlegungsschrift 2,325,826; and British Patent 1,465,812. The preferred diisocyanates to be used are 2,4-diisocyanatotoluene, 2,6-diisocyanatotoluene, mixtures of these isomers, 1,6-diisocyanatohexane, isophorone diisocyanate and mixtures of these latter two diisocyanates.

Polyisocyanate adducts containing urea or preferably urethane groups and based on the reaction product of the previously mentioned diisocyanates and compounds having a molecular weight of less than 400 and containing 2 or more isocyanate-reactive hydrogens may be prepared according to the process disclosed in U.S. Pat. No. 3,183,112. When preparing polyisocyanate adducts using a large excess of diisocyanate, the average isocyanate functionality may be determined from the functionality of the compounds containing isocyanate-reactive hydrogens. For example, theoretically when an excess of a diisocyanate is reacted with a diol, a polyisocyanate with a functionality of approximately 2 will be produced, while a triol co-reactant will result in a polyisocyanate functionality of at least 3. By using mixtures of compounds containing isocyanate-reactive hydrogens, various functionalities can be obtained. The preferred isocyanate-reactive hydrogens are provided by hydroxyl groups, although other groups such as amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine, trimethylol propane, ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides. 1,3- and 1,4-butanediol, 2,2,4-trimethyl-1,3-pentanediol, trimethylol propane and mixtures thereof are particularly preferred. It is also possible to use any of the previously described polyisocyanate adducts for the further preparation of polyisocyanate adducts containing urethane or urea groups. Preferred diisocyanates are 2,4-diisocyanato-toluene, 2,6-diisocyanatotoluene, 1,6-diisocyanatohexane, isophorone diisocyanate and mixtures of these diisocyanates.

In addition to using the previously described monomeric polyisocyanates or polyisocyanate adducts as the polyisocyanate component of the present invention, it is also suitable to prepare the polyisocyanate component from isocyanate-terminated prepolymers. These prepolymers are formed by reacting an excess of the previously described polyisocyanates, preferably monomeric diisocyanates, with high molecular weight isocyanate-reactive compounds and optionally low molecular weight isocyanate-reactive compounds. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups. The high molecular weight compounds to be used with the previously described polyisocyanates for preparing the isocyanate-terminated prepolymers are selected from the known compounds containing isocyanate-reactive groups, preferably hydroxyl groups, which are at least difunctional in the sense of the isocyanate-addition reaction. These compounds generally have an average functionality of about 2 to 8, preferably 2 to 4. The compounds containing at least two isocyanate-reactive hydrogen atoms generally have a molecular weight ($M_n$, as determined by end group analysis) of 400 to about 10,000, preferably 400 to about 8,000.

Examples of the high molecular weight compounds are polyester polyols, polyether polyols and amines, polyhydroxy polycarbonates, polyhydroxy polyacetals, polyhydroxy polyacrylates, polyhydroxy polyester amides and polyhydroxy polythioethers. The preferred high molecular weight isocyanate-reactive compounds for use in the process according to the invention are the polyhydroxyl polyethers, polyesters, polylactones, polycarbonates, polyester carbonates and especially polyacrylates.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g. ε-caprolactone or hydroxycarboxylic acids, e.g. δ-hydroxycaproic acid, may also be used.

Polycarbonates containing hydroxy groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained form the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris(hydroxylphenyl)-ethane.

Polyethers which have been obtained by the reaction of starting compounds containing amine compounds can also be used, but are less preferred for use in the present invention. Suitable amine starting compounds include: ammonia, methyl amine, tetramethylene diamine, ethanolamine, diethanolamine, triethanolamine, ethylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

The preferred starting compounds for the polyethers are those compounds which exclusively contain hydroxyl groups, while compounds containing tertiary amine groups are less preferred and compounds containing isocyanate-reactive-NH groups are much less preferred.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4′-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamines are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

In addition to the high molecular weight compounds, the isocyanate-terminated prepolymers may also optionally be prepared from low molecular weight isocyanate-reactive compounds having an average molecular weight of up to 400. The low molecular weight isocyanate-reactive compounds should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry such as those listed as suitable for preparing the polyisocyanate adducts containing urethane or urea groups and the polyester and polyether polyols. Additional examples include those set forth in U.S. Pat. Nos. 4,439,593 and 4,518,522, both of which are herein incorporated by reference in their entirety.

A solvent or solvent mixture may be used during the production of the polyisocyanate adducts or isocyanate-terminated prepolymers although solvents are not necessary. When a solvent is employed, e.g., to promote thorough mixing of the compounds used for preparing the isocyanate-terminated prepolymer, the solvent or solvent mixture is subsequently distilled off, preferably under vacuum, leaving a ready-to-use, liquid polyisocyanate component in solvent-free form.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

Prior to their use in accordance with the present invention, the isocyanate groups of the polyisocyanate component are blocked with a phenolic blocking agent. Examples of suitable blocking agents include phenol or alkylated phenols such as nonylphenol, the cresols, the trimethyl phenols and the tert.-butyl phenols. The reaction between the isocyanate groups and the blocking agent is conducted at a temperature of about 50° to 120° C., preferably about 70° to 100° C. The reaction may be conducted in the presence of a solvent although the presence of a solvent is not necessary. Suitable solvents include those previously set forth for preparing the polyisocyanate adducts or isocyanate-terminated prepolymers.

Suitable polyamine salts for use in accordance with the present invention are those which remain stable in the presence of the polyisocyanate component for at least one month, preferably for at least two months, when stored at ambient temperature. The polyamine salts are prepared by reacting a solid or liquid polyamines with organic or inorganic acids in order to form a solid product.

Suitable polyamines for preparing the solid polyamine salts have a molecular weight ($M_n$, as determined by end group analysis) of 60 to about 10,000, preferably 60 to about 6000 and most preferably 60 to about 400, and have an average functionality of about 2 to 8, preferably about 2 to 4. Examples of suitable high molecular weight amines are the amino-terminated polyethers previously set forth as being suitable for preparing the isocyanate-terminated prepolymers. Examples of low molecular weight polyamines include ethylene diamine, propylene diamine, butylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 2,4- and/or 2,6-toluylene diamine, 4,4'- and/or 2,4-diaminodiphenyl methane, polyphenylene polymethylene polyamines of the kind obtained by the aniline/formaldehyde condensation reaction and mixtures thereof.

Suitable organic or inorganic acids for reaction with the polyamines to form the polyamine salts include mineral acids, carbon dioxide and carboxylic acids and their anhydrides. Preferred acids are the organic alkyl carboxylic acids containing 1 to 20, preferably 2 to 8 carbon atoms. Volatile organic acids such as acetic acid are especially preferred. The polyamines and acids are reacted in amounts sufficient to provide a ratio of amino groups to acid groups of about 1.0:0.01 to 1.0:1.0, preferably about 1.0:0.07 to 1.0:0.5.

In order to prepare the one-component compositions according to the present invention, the solid polyamine salt is dispersed into the liquid, phenolic blocked polyisocyanate. The amounts of these components are selected to provide an equivalent ratio of isocyanate groups to amine groups of about 4:1 to 0.5:1.0, preferably about 1.8:1.0 to 0.8:1.0.

In accordance with the present invention it is possible to replace up to 75% by weight, preferably up to 50% by weight of the liquid blocked polyisocyanate with an epoxy resin in order to improve the hardness or adhesion to substrates of the resulting polyurethane or polyurea. Generally, in order to obtain improved hardness or adhesion, it is necessary to replace at least 5% by weight, preferably at least 10% by weight of the liquid blocked polyisocyanate. In determining the amount of solid polyamine internal salt to be dispersed into the mixture of liquid blocked polyisocyanate and epoxy resin, an epoxide group is considered to be the same as one isocyanate group such that the ratio of isocyanate and epoxide groups to amino groups should conform to the above ratios.

Suitable epoxy resins have an average molecular weight ($M_n$, as determined by end group analysis) of 500 to 20,000, preferably about 500 to 5000. The epoxy resins may be prepared from a dihydric phenol and a diglycidyl ether of a dihydric phenol. Both the dihydric phenol and the diglycidyl ether of a dihydric phenol may also contain other substituents such as alkyl, aryl, sulfido, sulfonyl, halo, etc.

Examples of suitable phenols include 2,2-bis(4-hydroxyphenyl)-propane, 2,2-bis(3-bromo-4-hydroxyphenyl)-propane, 2,2-bis(3-chloro-4-hydroxyphenyl)-propane, bis(4-hydroxyphenyl)methane, bis(4-hydroxyphenyl)-sulfone, bis(4-hydroxyphenyl)sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability.

The diglycidyl ether derivatives are prepared by the reaction of a dihydric phenol with a halogen-containing epoxide or dihalohydrin in the presence of an alkaline medium. By varying the ratios of the dihydric phenol and epichlorohydrin reactants, different molecular weight products can be obtained as described in U.S. Pat. Nos. 2,582,985; 2,615,007 and 2,633,458.

For purposes of the present invention, optionally at least a portion of the diglycidyl ether of a dihydric phenol component can be replaced with a diglycidyl ether of a hydrogenated dihydric phenol derivative. For example, the diglycidyl ether of dihydric phenol can have up to essentially 100 percent of its weight substituted by a diglycidyl ether such as 2,2-bis(4-hydroxycyclohexyl)propane or bis(4-hydroxycyclohexyl)methane.

The compositions according to the present invention may be cured at ambient temperature by the addition of a polar solvent. Suitable solvents are those which contain oxygen or nitrogen atoms and may either be inert to isocyanate groups or reactive with isocyanate groups. Examples of solvents which are inert to isocyanate groups include butyl acetate, ethylacetate, ethylene glycol monoethyl ether acetate, ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone, methyl isobutyl ketone, propylene carbonate, dioxane, dimethyl formamide, N-methyl pyrrolidinone and mixtures of the these solvents. N-methyl pyrrolidinone is especially preferred.

Examples of polar solvents which are reactive with isocyanate groups include hydroxyl group-containing solvents, preferably solvents having 1 to 8 carbon atoms such as methanol, ethanol, n-propanol, isopropanol, n-butanol, isobutanol, tert. butanol, n-hexanol, cyclohexanol and 2-ethylhexanol. Isopropanol is especially preferred. Mixtures of water and polar solvents, especially N-methyl pyrrolidinone, are considered to be reactive solvents in accordance with the present invention.

The preferred amount of the polar solvent to be added in order to cure the compositions of the present invention is about 5 to 100 weight percent, more preferably about 10 to 80 weight percent, based on the weight of the liquid polyisocyanate component and the solid polyamine. Greater amounts of solvent may be used, e.g., to reduce the viscosity of the composition to an appropriate level for its intended application. However, larger amounts of solvent than are necessary to cure the compositions are not preferred for environmental reasons.

The solid polyamine salts which are not solubilized by polar solvents alone may be solubilized by using water in combination with a water miscible solvent. By varying the amount of water, the curing rate of the compositions may be increased or decreased.

The compositions according to the present invention may also be cured at elevated temperatures, i.e., at temperatures above the melting point of the solid polyamines. Temperatures which are sufficient to unblock the polyisocyanate may also be used when an extremely rapid cure of the composition is desired. Generally, the compositions are cured at temperatures of about 70° to 200° C., preferably about 100° to 140° C.

The one-component compositions of the present invention can be cured to form high quality elastomers, coatings, cellular elastomers and moldings optionally having a density distribution characterized by a cellular inner core and a more compact outer skin.

The invention is further illustrated but is not intended to be limited by the following examples in which all parts and percentages are by weight unless otherwise specified.

EXAMPLE 1

Preparation of an Isocyanate-Terminated Prepolymer

Into a 1000 ml three-neck flask equipped with a mechanical stirrer and a thermometer was charged 64.8 parts of TDI (which is an 80/20 weight percent mixture of the 2,4-isomer and 2,6-isomer of toluylene diisocyanate). To the stirred contents of the flask, which was maintained at 70° C., were added 468.0 parts of a polyether polyol having secondary hydroxyl groups, an OH number of 42 and a functionality of 2.6 and prepared by alkoxylating a mixture of 74 weight percent glycerine and 24 weight percent propylene glycol with a mixture of 85 weight percent propylene oxide and 15 weight percent ethylene oxide. Upon completion of the addition, the temperature of the reaction mixture increased slightly due to the exothermic reaction. The contents of the flask were maintained at 70° C. for 2 hours or until the theoretical isocyanate content was obtained. Thereafter, 105.6 parts of nonyl phenol and 0.08 parts of stannous octoate were added, the temperature was decreased to 50° C., and the reaction mixture was maintained at this temperature for 3 hours or until there was no detectable isocyanate content. The blocked prepolymer was then poured from the reaction flask into a storage container, purged with nitrogen, sealed and allowed to cool to ambient temperature.

EXAMPLE 2

Preparation of a One Component Composition Comparison

A one component composition was prepared by dispersing 7.2 parts of 1,6-hexamethylene diamine into 200.0 parts of the blocked isocyanate-terminated prepolymer of Example 1. The composition gelled after 6 hours storage at ambient temperature.

EXAMPLE 3

Preparation of a Polyamine Salt

The quantities of 1,6-hexamethylene diamine (HDA) and acetic acid set forth in the following Table were reacted at 75° C. and cooled to room temperature.

TABLE

| Example | HDA (parts) | Acetic Acid (parts) |
|---------|-------------|---------------------|
| 3a | 27.3 | 2.0 |
| 3b | 20.0 | 5.2 |
| 3c | 19.7 | 9.4 |

As the amount of acetic acid increased, the melting point of the solid polyamine salt increased.

EXAMPLE 4

Preparation of a One Component Composition According to the Invention

Three one component coating compositions were prepared by mixing 7.5 parts of each of the polyamine amine salts set forth in the Table of Example 3 with 100.5 parts of the blocked isocyanate-terminated prepolymer of Example 1. The compositions remained stable in storage for more than 3 months. Thereafter, the compositions were cured to form a polyurethane by heating for 30 minutes at 100° C.

EXAMPLE 5

Preparation of a One Component Composition According to the Invention

When the compositions of Example 4 are blended with an equal amount of a solvent such as a 2/1 mixture of N-methylpyrrolidone and water, the compositions solidify within a few hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-component polyurethane or polyurea composition which may be cured at either ambient or elevated temperature and comprises
    a) a liquid blocked polyisocyanate wherein the isocyanate groups have been blocked with a phenolic blocking agent and
    b) a solid polyamine salt which is insoluble in and dispersed throughout the liquid blocked polyisocyanate, said solid polyamine salt being based on the reaction product of a polyamine with an organic or inorganic acid.

2. The composition of claim 1 wherein said liquid blocked polyisocyanate comprises a blocked isocyanate-terminated prepolymer and said polyamine has a molecular weight of 60 to about 400.

3. The composition of claim 1 wherein said phenolic blocking agent comprises nonyl phenol.

4. The composition of claim 1 wherein said solid polyamine salt is based on the reaction product of a polyamine having a molecular weight of 60 to about 400 with an organic acid.

5. The composition of claim 4 wherein said organic acid comprises acetic acid.

6. The composition of claim 1 wherein 5 to 75% by weight of the liquid blocked polyisocyanate is replaced by an epoxy resin.

7. A process for the preparation of a polyurethane or polyurea which comprises heating a composition comprising
    a) a liquid blocked polyisocyanate wherein the isocyanate groups have been blocked with a phenolic blocking agent and
    b) a solid polyamine salt which is insoluble in and dispersed throughout the liquid blocked polyisocyanate, said solid polyamine salt being based on the reaction product of a polyamine with an organic or inorganic acid, to a temperature above the melting point of said solid polyamine salt.

8. A process for the preparation of a polyurethane or polyurea which comprises adding a polar solvent to a composition comprising
    a) a liquid blocked polyisocyanate wherein the isocyanate groups have been blocked with a phenolic blocking agent and
    b) a solid polyamine salt which is insoluble in and dispersed throughout the liquid blocked polyisocyanate, said solid polyamine salt being based on the reaction product of a polyamine with an organic or inorganic acid.

9. The process of claim 8 wherein said solvent is mixed with water.

* * * * *